Jan. 19, 1954  W. B. WOODRING ET AL  2,666,802
LAMELLATE FLAT CELL
Filed Nov. 21, 1950

INVENTORS
William B. Woodring
William W. Eaton
BY
ATTORNEYS

Patented Jan. 19, 1954

2,666,802

UNITED STATES PATENT OFFICE 2,666,802

LAMELLATE FLAT CELL

William B. Woodring, Hamden, and William W. Eaton, Milford, Conn., assignors to Olin Industries, Inc., New Haven, Conn., a corporation of Delaware Application November 21, 1950, Serial No. 196,850

5 Claims. (Cl. 136—111)

This invention relates to primary cells and batteries and more particularly to a miniature cell having certain desirable characteristics based on the size and relation of the cell elements.

The cell of the present invention consists of the usual elements. Thus, it may include a zinc anode, a carbon cathode, a depolarizing mix of manganese dioxide and carbon, and a separator carrying the usual electrolyte solution. The invention may also be applied to other types of cells depending upon electro-chemical action to generate a current. While certain features of the cell may be employed to advantage in cells of any size, the most advantageous form of the invention is a veneer thin cell in which the elements are not only thin, but are flat, that is, of substantially uniform thickness throughout, the thickness being very small compared to the dimensions.

Thus the cell, as distinguished from present day so-called "flat batteries," may be said to consist of elements in the form of lamellae, and the complete cell may be described as a lamellate structure.

The cell may be made by sealing an anode in sheet form carrying a separator and a sheet support carrying a coating forming a cathode on one side thereof to the opposite faces of a frame formed of a suitable dielectric plastic material with the depolarizing mix filling the space within the frame.

In the miniature size we have found the cells to have an unusually high capacity. This is probably due to extremely low internal resistance because of the thinness of the depolarizing layer. The thinness of this layer also permits highly efficient utilization of the depolarizer.

When the supporting sheet for the cathode coating is formed of metal, it and the metal anode, being heat sealed to the plastic frame, prevent loss of moisture from the cell. It also provides excellent electric connection between adjacent cells of a battery by mere stacking of the individual cells, as the construction produces metal to metal contact between the cells.

Figure 1:
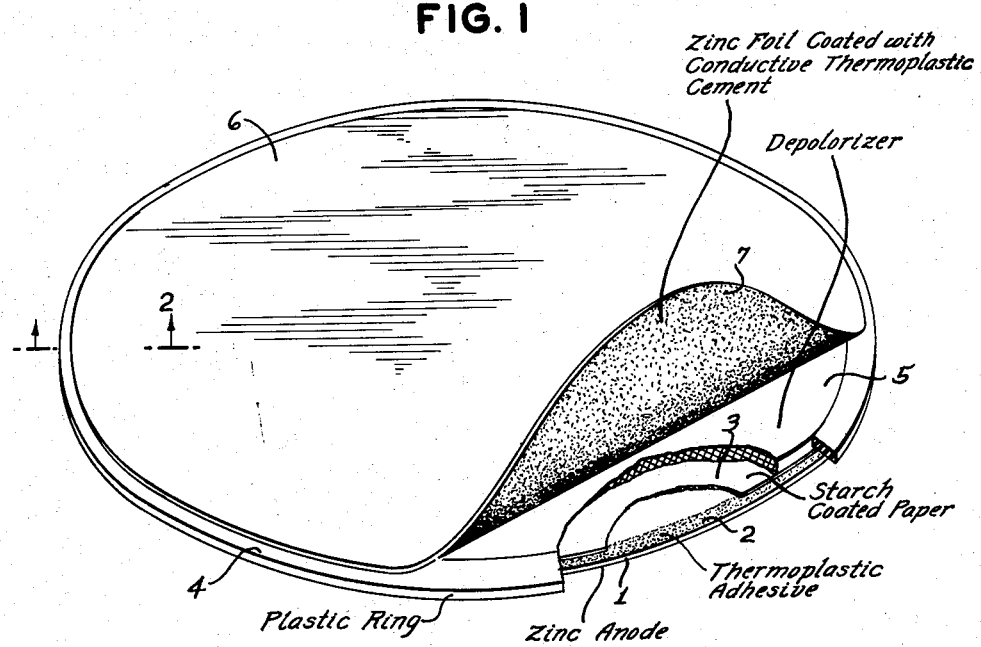
Figure 2:
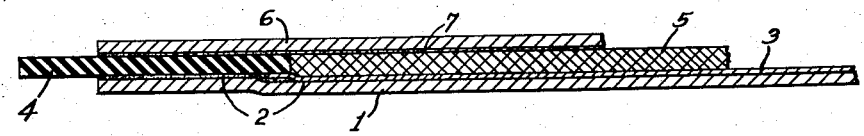

In the accompanying drawing we have shown one embodiment of the invention. In this showing:

Fig. 1 is a perspective view of a cell, on an enlarged scale, with the cathode supporting sheet partially raised and with the other elements partially broken away for clarity of presentation; and Fig. 2 is a transverse, sectional view on line 2—2 of Fig. 1.

The cell comprising the invention includes a zinc anode 1 in the form of a sheet of foil. Around the periphery of the anode we provide a layer 2 of an adhesive, preferably a thermoplastic adhesive. A sheet of paper 3, which forms a separator and which is of slightly smaller dimensions than the anode, is secured to the anode by the adhesive 2. As shown (see Fig. 2) the adhesive layer extends inwardly from the edge of the anode beyond the outer edge of the separator to permit sealing of the separator to the zinc foil. A plastic frame 4, which may be of slightly greater dimensions than the anode, is arranged over the anode and the separator and is sealed to the anode by that portion of the cement layer 2 which extends beyond the separator 3. A layer of depolarizing mix 5, of the same height or thickness as the thickness of the frame 4, is arranged within the frame. A cathode supporting sheet 6, which may be a sheet of zinc foil similar to the anode, is arranged on the opposite side of the frame. As shown, this sheet is provided with a cathode coating 7 which is conductive and is also a heat sensitive adhesive to seal to the surface of the frame 4.

The cells may be of any desired cross section, for example, circular, square, rectangular or elliptical and may also be of annular form. While the cell may be of any desired size, the best results of the construction are obtained when the cell is of veneer thickness. Thus, the plastic frame may be of a thickness from .001 to 0.100". This frame may be made of any available material that is dielectric and to which the cathode and anode may be sealed by a heat sensitive adhesive. Examples of material which may be employed are polystyrene, cellulose acetate-butyrate, polyvinyl chloride-acetate and similar materials. The zinc foil forming the cathode may be secured to one side of the frame and to the paper separator by any suitable adhesive. A solution of approximately equal parts of Buna N (butadiene acrylonitrile copolymer) and a phenolic resin may be employed. The paper separator is preferably coated on one side with starch and impregnated with a low concentration of an inhibitor, such as mecuric chloride or sodium dichromate. The electrolyte may consist of an aqueous solution of zinc chloride and ammonium chloride.

The depolarizer may consist of the usual mix of manganese dioxide and a conductive carbon, such as graphite or carbon black. It may be assembled as hereinafter set forth. In lieu of the usual depolarizer, the mix cake may be in sheet form, that is, a loosely woven cloth, paper or other suitable carrier, may be impregnated with the depolarizing mix.

The cathode is preferably supported on a metal sheet or foil but any electrically conductive supporting material, such as paper, cloth or the like, suitably impregnated, may be used. The outer-most layer of the cathode coating which contacts with the frame comprises a film of conductive heat sensitive adhesive which will bond to the plastic frame. The zinc foil may be coated with a conductive electrolyte-impervious layer of a mixture of polyvinyl chloride, dioctyl phthalate, and acetylene black and a conductive adhesive top layer of a mixture of polyvinyl acetate, tricresyl phosphate and acetylene black.

In constructing a cell embodying our invention, a zinc anode of a thickness of .002" is first coated with the adhesive layer 2. The paper liner 3 is then placed on the anode, the liner being of such size that it overlaps the adhesive layer. A plastic frame 4, preferably of slightly greater diameter than the anode, is placed on the anode and caused to adhere to it, either by a solvent or heat activation of the adhesive. The electrolyte is then added. The frame is then filled with the depolarizing mix 5. If the mix is in ordinary form, it is placed in the frame and levelled by a doctor blade. If the depolarizer is in sheet form, it is merely placed within the frame. The cathode is then placed in position and caused to adhere either by heat sealing or by covering the contact area between the cathode and the frame with a solution of adhesive and pressing the parts together.

As stated, cells of such size and construction have been found to have unusually high capacity as compared with cells of usual construction containing the same amount of depolarizer, especially on continuous discharge at a heavy drain. Thus, a tested cell in which the elements were circular, the frame 4 being 6" in external diameter, 5⅝" in internal diameter, and 0.012" in thickness, and the anode and cathode 5⅞" in diameter, having an initial open circuit value of 1.81 volts and a closed circuit value when connected to a resistance of 2.03 ohms of 1.52 volts and .75 ampere, after being on discharge for thirty minutes, had a value of 1.18 volts and .58 ampere. In addition, the cell possesses many other advantages. The cells can be aged individually and then readily tested before assembly into a battery. This permits discarding the single defective cell without disassembling a battery into which the cell has been assembled. The arrangement of the anode and paper separator with respect to the plastic frame prevents short-circuiting. The drying out of the cell is minimized by sealing the anode and cathode to the frame, thus limiting the possibility of moisture loss to a long path of small cross-section. When the cathode support is made of zinc and a plurality of cells assembled in a battery, if an anode becomes perforated, the adjacent contacting sheet 6 serves as the anode of the defective cell and thereby lengthens the life of the battery.

As many of the so-called "flat" cells are not, in reality flat, we have chosen the term "lamellate construction" as more accurate in defining the cell of the present invention, the individual components of the cell being truly lamellae and the thickness of the cell being the sum of the thickness of the anode, separator, cathode terminal and frame. As stated, the invention may be employed in connection with primary cell elements other than those of the Leclanché cell.

We claim:

1. A dry cell comprising a thin, flat frame of dielectric material of substantially uniform thickness having a central opening, a separator carrying electrolyte on one side of the frame extending over the opening, an anode comprising a sheet of zinc foil of larger dimension than the separator, the anode having a coating of adhesive adjacent its edge to secure the separator to the anode and the anode to the frame, a sheet cathode having a conductive coating on its inner surface sealed to the other side of the frame, and a depolarizer within the frame.

2. A dry cell comprising a thin, flat frame of dielectric material of substantially uniform thickness, an anode in sheet form sealed to one side of the frame, a cathode in sheet form sealed to the other side of the frame, and a depolarizer and electrolyte within the frame between the anode and cathode, the frame being larger than the anode and cathode and projecting beyond the edges of the anode and cathode.

3. A dry cell comprising a thin, flat frame of dielectric material of substantially uniform thickness having a central opening, a separator carrying electrolyte on one side of the frame extending over the opening, the separator being larger than the opening and having its edge portions sealed to the frame, an anode comprising a sheet of zinc foil of larger dimension than the separator, the anode having a coating of adhesive adjacent its edge to secure the separator to the anode and the anode to the frame, a sheet cathode having a conductive coating on its inner surface sealed to the other side of the frame, and a depolarizer within the frame.

4. A dry cell comprising a thin, flat frame of dielectric material of substantially uniform thickness having a central opening, a separator carrying electrolyte on one side of the frame extending over the opening, the separator being larger than the opening and having its edge portions sealed to the frame, an anode comprising a sheet of zinc foil of larger dimension than the separator, the anode having a coating of adhesive adjacent its edge to secure the separator to the anode and the anode to the frame, a sheet cathode having a conductive coating on its inner surface sealed to the other side of the frame, and a depolarizer within the frame, the frame being larger than the anode and cathode and projecting beyond the edges of the anode and cathode.

5. A dry cell comprising a thin, flat frame of dielectric material of substantially uniform thickness, an anode in sheet form sealed to one side of the frame, a cathode in sheet form, having a conductive coating on its inner surface sealed to the other side of the frame, and a depolarizer and electrolyte within the frame between the anode and cathode, the frame being larger than the anode and cathode and projecting beyond the edges of the anode and cathode.

WILLIAM B. WOODRING.
WILLIAM W. EATON.

References Cited in the file of this patent

UNITED STATES PATENTS

| Number | Name | Date |
| --- | --- | --- |
| 1,613,585 | Dam | Jan. 4, 1926 |
| 1,673,400 | Dam | June 12, 1928 |
| 1,916,698 | Storey | July 4, 1933 |
| 2,463,565 | Ruben | Mar. 8, 1949 |
| 2,519,053 | Reinhardt | Aug. 15, 1950 |

FOREIGN PATENTS

| Number | Country | Date |
| --- | --- | --- |
| 563,739 | France | Dec. 12, 1923 |
| 284,626 | Great Britain | Apr. 25, 1929 |
| 300,640 | Great Britain | Aug. 15, 1929 |
| 232,994 | Switzerland | Sept. 16, 1944 |